US009874013B2

(12) United States Patent
Bergman et al.

(10) Patent No.: US 9,874,013 B2
(45) Date of Patent: Jan. 23, 2018

(54) CONCEALED GRID CEILING SYSTEM

(71) Applicant: ARMSTRONG WORLD INDUSTRIES, INC., Lancaster, PA (US)

(72) Inventors: Todd M. Bergman, Lititz, PA (US); Frances Testa, Lancaster, PA (US); James R. Waters, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 15/169,103

(22) Filed: May 31, 2016

(65) Prior Publication Data
US 2016/0273219 A1 Sep. 22, 2016

Related U.S. Application Data

(63) Continuation of application No. 14/423,817, filed as application No. PCT/US2013/058015 on Sep. 4, 2013, now Pat. No. 9,353,522.
(Continued)

(51) Int. Cl.
*E04B 9/26* (2006.01)
*E04B 9/10* (2006.01)
(Continued)

(52) U.S. Cl.
CPC ............. *E04B 9/10* (2013.01); *E04B 9/04* (2013.01); *E04B 9/0435* (2013.01);
(Continued)

(58) Field of Classification Search
CPC . E04B 2/7457; E04B 9/28; E04B 9/24; E04B 9/26; E04B 9/225; E04B 9/241;
(Continued)

(56) References Cited

U.S. PATENT DOCUMENTS 419,388 A 1/1890 White et al.
2,859,469 A * 11/1958 Stockdale .............. A47B 91/04
16/42 R
(Continued)

FOREIGN PATENT DOCUMENTS

CA 2127983 12/1997
CN 1207151 6/2005
(Continued)

OTHER PUBLICATIONS

International Search Report for corresponding PCT/US2013/58015, dated Dec. 11, 2013. WO.
(Continued)

*Primary Examiner* — Gisele Ford
(74) *Attorney, Agent, or Firm* — Craig M. Sterner

(57) ABSTRACT

A ceiling system in one embodiment includes an overhead support grid comprised of a plurality of intersecting grid support members and a ceiling tile mountable to the grid. Retaining clips support the ceiling tile from the grid which may be concealed from view. The retaining clips each include a cavity that receives a grid support member and a pair of resilient mounting elements configured to lockingly engage a support member. The mounting elements are laterally movable in response to inserting the support member into the cavity of the retaining clip. In one embodiment, the movable elements include locking tabs which create a snap-fit interlock with the grid support member for securing the ceiling tile to the grid.

20 Claims, 15 Drawing Sheets

Related U.S. Application Data

(60) Provisional application No. 61/696,424, filed on Sep. 4, 2012.

(51) Int. Cl.
*E04B 9/06* (2006.01)
*E04B 9/04* (2006.01)
*E04B 9/22* (2006.01)
*E04B 9/24* (2006.01)
*F16B 2/24* (2006.01)
*F16B 5/12* (2006.01)
*E04B 9/36* (2006.01)

(52) U.S. Cl.
CPC ............ *E04B 9/0464* (2013.01); *E04B 9/067* (2013.01); *E04B 9/225* (2013.01); *E04B 9/241* (2013.01); *E04B 9/26* (2013.01); *F16B 2/243* (2013.01); *F16B 5/125* (2013.01); *E04B 9/064* (2013.01); *E04B 9/36* (2013.01)

(58) Field of Classification Search
CPC .......... E04B 9/04; E04B 9/067; E04F 13/088; F16B 5/125; F16B 2/243
See application file for complete search history.

(56) References Cited

U.S. PATENT DOCUMENTS

| | | |
|---|---|---|
| 3,869,760 A | 3/1975 | Meyer |
| 4,546,587 A | 10/1985 | Mosch |
| 4,926,606 A | 5/1990 | Hanson |
| 6,964,137 B2 | 11/2005 | Frascari |
| 7,010,894 B1 | 3/2006 | Cappelle |
| 8,359,802 B1 | 1/2013 | Burnett et al. |
| 8,544,229 B2 | 10/2013 | Kilgore et al. |
| 2007/0033902 A1 | 2/2007 | Waters et al. |
| 2009/0000248 A1 | 1/2009 | Waters et al. |
| 2009/0151134 A1 | 6/2009 | Neuhofer, Jr. |
| 2010/0257808 A1 | 10/2010 | Baxter et al. |
| 2011/0078970 A1* | 4/2011 | Boyd ............... E04B 9/241 52/506.07 |
| 2013/0067833 A1 | 3/2013 | Agueera Riquelme |
| 2015/0040506 A1 | 2/2015 | Baxter et al. |

FOREIGN PATENT DOCUMENTS

| | | |
|---|---|---|
| CN | 102251618 | 11/2011 |
| EP | 0979908 | 2/2000 |
| WO | 2009099664 | 8/2009 |
| WO | 2010098889 | 9/2010 |

OTHER PUBLICATIONS

CN Search Report for corresponding CN Application No. 2013800460314, dated Jan. 20, 2016. CN.

* cited by examiner

CONCEALED GRID CEILING SYSTEM

CROSS-REFERENCE TO RELATED APPLICATIONS

The present application is a continuation of U.S. patent application Ser. No. 14/423,817 filed Feb. 25, 2015, which is a U.S. national stage application under 35 U.S.C. §371 of PCT/US2013/058015 filed Sep. 4, 2013, which claims the benefit of U.S. Provisional Patent Application Ser. No. 61/696,424 filed Sep. 4, 2012, the entireties of which are incorporated herein by reference.

FIELD OF THE INVENTION

The present invention relates to ceiling systems, and more particularly to ceiling systems having a concealed support grid enabled by a retaining clip system.

BACKGROUND OF THE INVENTION

One type of ceiling system includes ceiling panels or tiles that are installed in a support grid which may be suspended from or directly installed to a suitable overhead building support structure. Such ceiling systems may be designed to partially or completely conceals the support grid from view.

An improved ceiling system with concealed support grid is desired.

SUMMARY OF THE INVENTION

The present invention provides a ceiling system in which individual ceiling elements may be mounted to overhead support members in a secure and stable manner. In one embodiment, without limitation, a specially configured retaining clip is provided that is mountable in a track-like mounting system formed in the ceiling tile comprised of a plurality of elongated channels. The retaining clips and channels permit the ceiling tiles to be installed in a manner that conceals the support grid from view. Advantageously, the shape of ceiling tiles that may be used is not restricted by the arrangement and pattern of the grid support members, as further described herein, According to an exemplary embodiment, a ceiling system includes a longitudinally-extending grid support member mountable from an overhead structure, a ceiling tile including a mounting channel extending at least partially between first and second opposing peripheral sides of the ceiling tile, and a retaining clip slideably disposed in the mounting channel of the ceiling tile. The retaining clip includes a pair of opposing and resiliently deformable mounting elements. The mounting elements are spaced apart to define a cavity configured to receive the grid support member at least partially therein. The mounting elements are laterally spreadable in response to inserting the grid support member into the cavity of the retaining clip, wherein the retaining clip is configured to lockingly engage the grid support member when in a locked position fully inserted into the cavity of the retaining clip for securing the ceiling tile to the grid support member. The grid support member is concealed from view beneath the ceiling tile.

According to another exemplary embodiment, a retaining clip attachable to a grid support member of a ceiling system is provided for supporting a ceiling tile. The retaining clip includes a mounting flange configured for attachment to the ceiling tile, and a pair of opposing resiliently deformable upright mounting wings configured for attachment to the grid support member. The mounting wings extend upwards from the mounting flange and are spaced apart to define an upwardly open cavity configured to receive the grid support member at least partially therein. The mounting wings are laterally deformable between undeflected and deflected positions in response to inserting the grid support member into the cavity of the retaining clip. The mounting wings include locking tabs which lockingly engage the grid support member when in a mounted position inside the cavity of the retaining clip.

A method for mounting a ceiling tile to a grid support member of a ceiling system is provided. The method includes: providing a grid support member mountable from an overhead support structure; providing a ceiling tile including a horizontally elongated mounting channel, the channel being open through a top surface of the ceiling tile; slideably inserting a retaining clip into the mounting channel through a peripheral side of the ceiling tile; sliding the retaining clip to a desired mounting position; vertically aligning an open cavity of a retaining clip with the grid support member; inserting the grid support member into the cavity of the retaining clip; laterally displacing a pair resiliently deformable locking tabs positioned in the cavity with the grid support member; and lockingly engaging the locking tabs with the grid support member for securing the ceiling tile to the grid support member.

BRIEF DESCRIPTION OF THE DRAWINGS

The features of the exemplary embodiments of the present invention will be described with reference to the following drawings, where like elements are labeled similarly, and in which.

Figure 1:
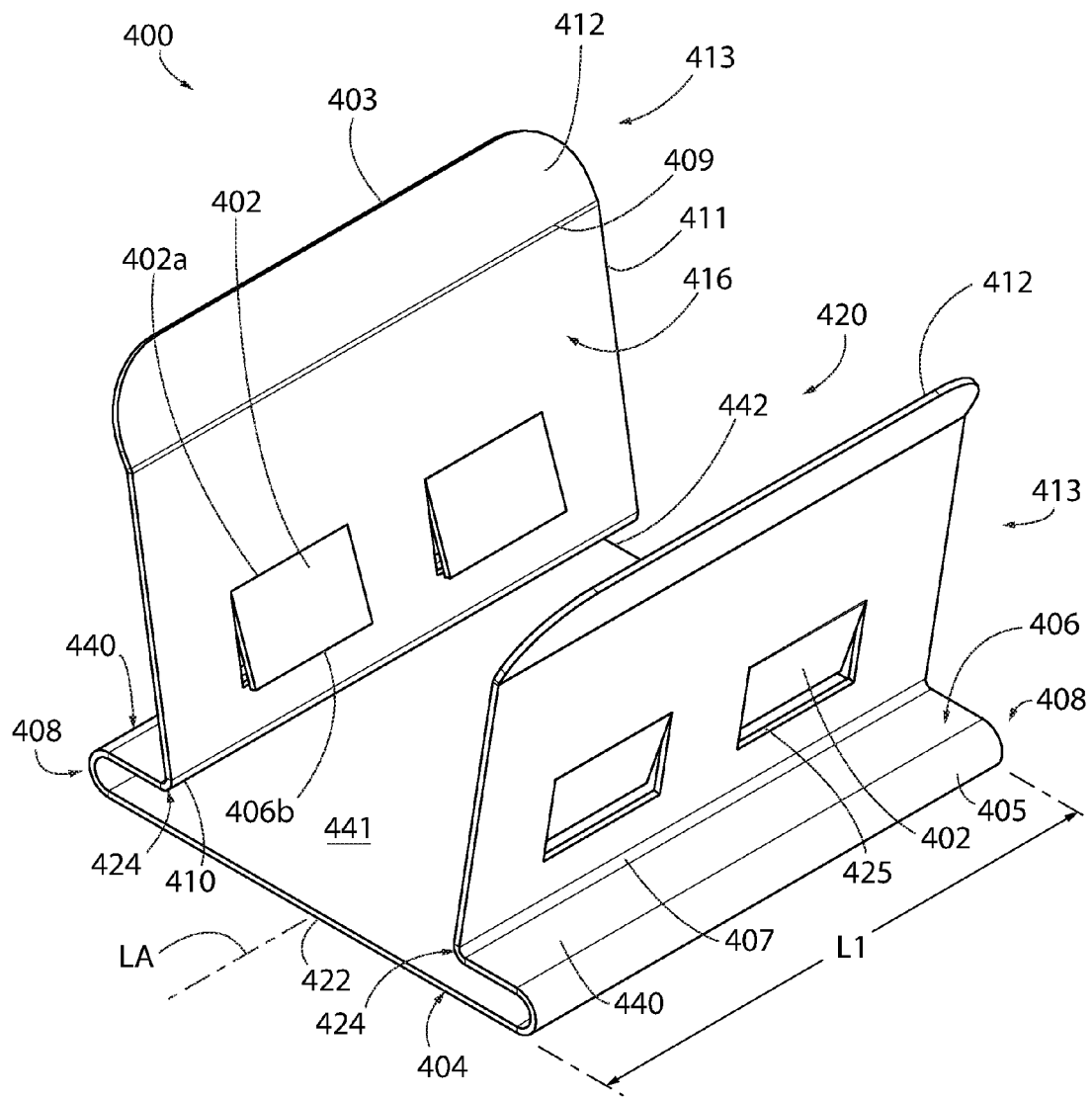
FIG. 1 is a perspective view of a ceiling tile retaining clip for use in a ceiling system according to the present disclosure.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

FIGS. 8-13 depict an exemplary ceiling system 100 according to one embodiment of the present disclosure for forming a concealed grid. The ceiling system 100 includes a support grid 200 comprised of a plurality of longitudinally-elongated, intersecting grid support members 202 and at least one ceiling tile 300 mounted to the support members with retaining clips 400. In one embodiment, grid support members 202 may be horizontally oriented when installed. It will be appreciated, however, that other suitable mounted orientations of support members 202 may be used such as vertical and angled or slanted (i.e. between 0 and 90 degrees to horizontal). Accordingly, although support members 202 may be described in one exemplary orientation herein as horizontal, the invention is not limited to this orientation alone and other orientations may be used.

Grid support members 202 are arranged to form an array of grid openings 208 which define a grid spacing S2 that corresponds to a mounting channel spacing 51 in the ceiling tile 300. Accordingly, spacing S2 is substantially equal to spacing 51 to allow the grid support members 202 to engage retaining clips 400 located in the mounting channels 330 of the ceiling tile, as further described herein. In some embodiments, the grid support members 202 (and concomitantly mounting channels 330) may be arranged in an orthogonal pattern wherein support members intersect at right angles to form rectilinear grid openings 208 such as squares or rectangles (in top plan view). Other shapes of grid openings 208 are possible. The terminal ends 230 of at least some of the grid support members 202 may be configured to interlock with other transversely oriented grid support members 202 at right angles (see, e.g. FIG. 13) to form the rectilinear grid pattern in a manner well known to those skilled in the art without further elaboration. Any suitable interlocking mechanism and configuration may be used.

Figure 15:
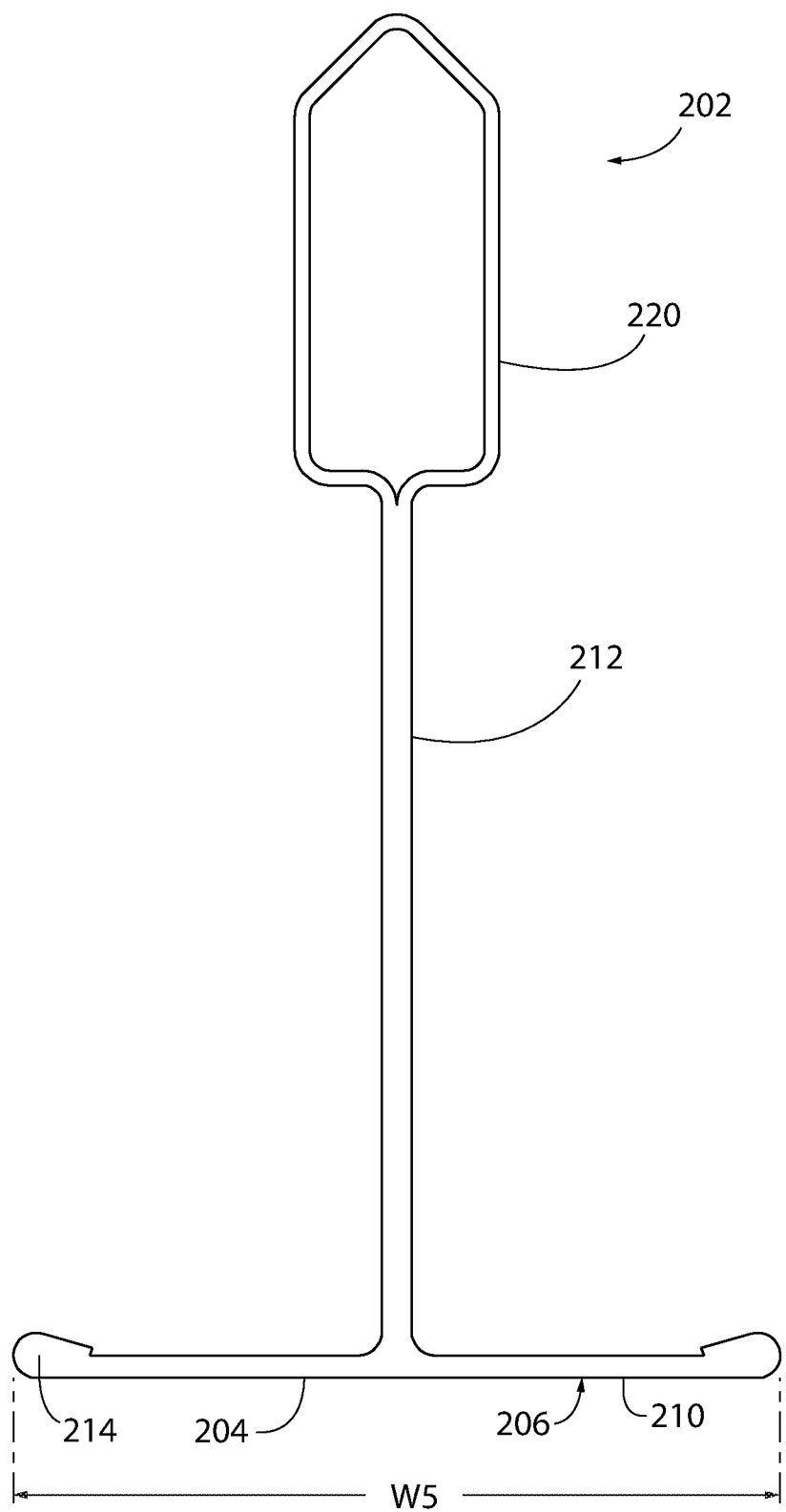
FIG. 15 is an end elevation view of the grid support member.

In transverse cross section (with additional reference to FIG. 15), grid support members 202 may have a generally inverted T-shaped configuration when in an installed position either suspended from or directly attached to an overhead ceiling support structure via an attachment mechanism such as without limitation fasteners, hangers, wires, cables, rods, struts, etc. Grid support members 202 may include a longitudinally-extending horizontal bottom flange 210, a bulbous top stiffening channel 220, and a vertical web 212 extending upwards from the flange to the stiffener. The grid support members 202 each define a longitudinal axis LA and axial direction. Web 212 may be centered between opposing side ends of flange 212 in one embodiment. Bottom flange 210 defines upward facing bearing surfaces 204 configured and arranged to engage retaining clip 400. Bearing surfaces 204 are disposed on each side of web 212 and extend laterally from the web outwards to longitudinally extending opposed lateral edges 214 of the bottom flange 210. Bottom flange 210 further defines a bottom surface 206 facing downwards towards the ceiling tile 300 and a room or space below the support grid. Bottom surface 206 defines a first horizontal reference plane P1 of the overhead support grid 200 which is spaced vertically above a second horizontal reference plane P2 defined by the bottom surface 304 of the ceiling tile.

Grid support members 202 may be made of metallic or non-metallic material suitable to engage clips 400 and support the dead or weight load of ceiling tiles 100 without undue deflection. In some preferred but non-limiting embodiments, support members 110 may be made of metal including aluminum, titanium, steel, or other.

Referring to FIGS. 5-10, ceiling tiles 300 each include a top surface 302, bottom surface 304, and peripheral sides 306, 308, 310, and 312 each defining a peripheral edge. The distance between opposing peripheral sides defines widths and/or lengths of the ceiling tile 300. In one embodiment, the peripheral sides may have a straight edge (see, e.g. FIG. 6) in side profile to form straight butt joints with adjacent tiles in the ceiling system 100. Other suitable edge profiles, however, such as angled, tegular, rabbeted, etc. are possible.

Top and bottom surfaces 302, 304 may be substantially planar or flat, or alternatively may include various surface features, textures, and patterns such as perforations, wavy raised surfaces, undulating surface contours, linear grooves and ridges, or other. Accordingly, the top and bottom surfaces 302, 304 are not limited to any particular surface profile. In one embodiment, the top surface of 302 of the ceiling tile 300 may be flat which may serve as a reference surface for locating the mounting channels 330 at a uniform position in each ceiling tile during manufacture.

Ceiling tiles 300 may have substantially uniform thickness T1 wherein top surface 302 is substantially parallel to bottom surface 304 between the peripheral sides 306, 308, 310, and 312. In other possible embodiments, top and bottom surfaces 302, 304 may be angled with respect to each other to form a reveal between adjacent ceiling tiles wherein one or more peripheral sides 306, 308, 310, or 312 project below the bottom surface 304 of an adjacent ceiling tile 300.

With continuing reference to FIGS. 5-10, ceiling tiles 300 include a plurality of longitudinally-extending recessed mounting channels 330 formed through and penetrating top surface 302 so that the channels are open in an upwards direction facing the overhead support grid 200. Channels 330 extend longitudinally across the tile and parallel to the top and bottom surfaces 302, 304. Each channel 330 penetrates at least one peripheral edge formed by peripheral sides 306, 308, 310, or 312 of ceiling tile 300 to allow insertion of a retaining clip 400 through a side of the ceiling tile into the channel. In one embodiment, as shown for example in FIG. 5, the channels 330 are arranged to penetrate each peripheral side 306, 308, 310, or 312. In this embodiment, each channel 330 further penetrates two opposing peripheral sides 306, 308, 310, or 312, which maximizes the possible insertion and mounting locations of retaining clip 400 on ceiling tile 300.

Figure 5:
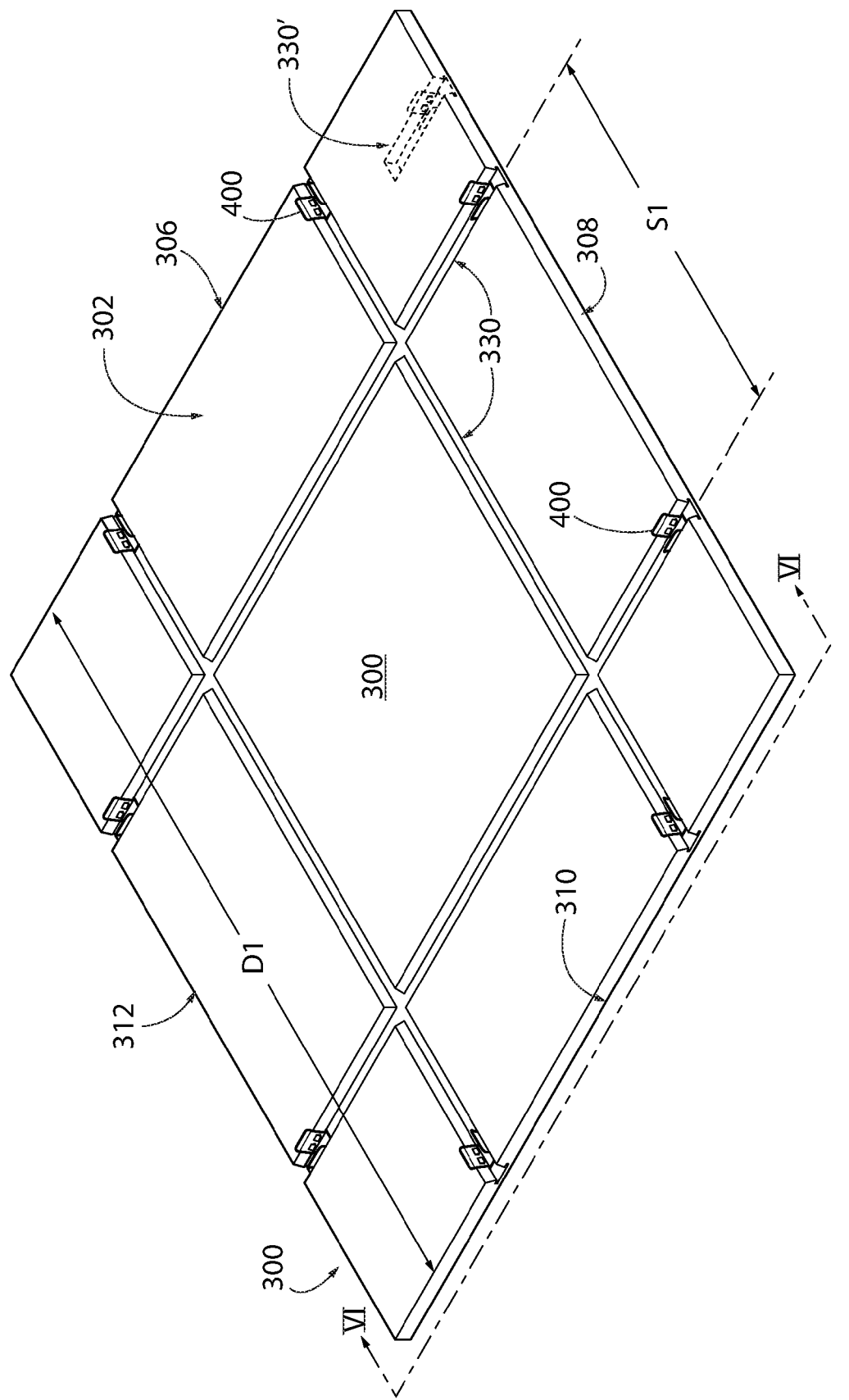
FIG. 5 is a top perspective view of a ceiling tile with retaining clips of FIG. 1 mounted therein.
Figure 6:
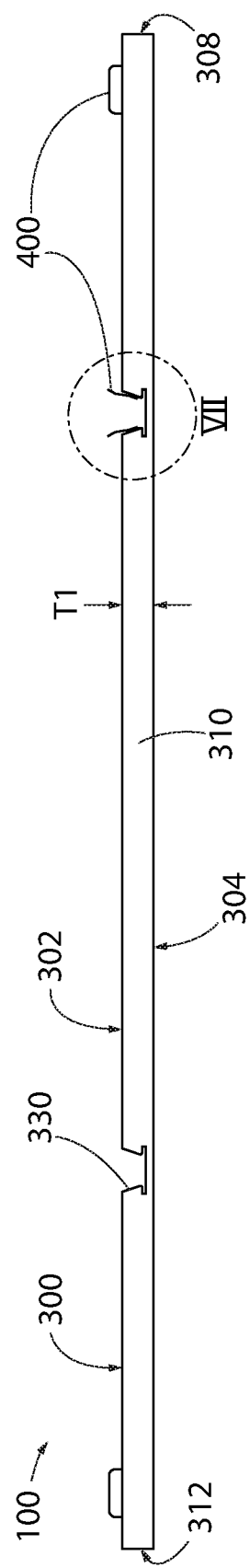
FIG. 6 is a side elevation view thereof.

It will be appreciated that in other possible configurations and arrangements of channels 330, however, that some or all of the channels may extend horizontally/laterally only partially across the width/length of the ceiling tile 300 from one peripheral side 306, 308, 310, or 312, as represented by channel 330' shown in dashed lines in FIG. 5. This partial channel 330' terminates at a dead end, which limits the maximum lateral insertion distance of the retaining clip 400 into the channel. This arrangement further limits the range of possible ceiling tile mounting locations for retaining clip 400, which may be desirable in some particular applications.

Each channel 330 includes an open top 331, an upper receptacle 332 including two opposing sidewalls 333, and a lower retaining clip mounting receptacle 334. In one embodiment, sidewalls 333 may be sloped or angled with respect to a vertical centerline CV2 defined by the channel 330. Accordingly, sidewalls 333 may each be disposed at an angle A3 to vertical centerline CV2 between 0 and 90 degrees. The angled sidewalls 333 allow the retaining clip 400 to expand laterally outwards into a gap G formed between the sidewalls and resiliently flexible mounting elements such as upright wings 413 of the clip when mounting the ceiling tile 300 to a grid support member 202, as further described herein. The gap G may be wedge-shaped. In other possible embodiments, the sidewalls may be arranged parallel to vertical centerline CV2 (e.g. perpendicular to top surface 320) as represented by the dashed line 333' in FIG. 7 provided sufficient lateral space is created between the opposing sidewalls to allow the retaining clip 400 enough room to expand laterally by a sufficient amount to lock the retaining clip to the grid support member 202.

Figure 2:
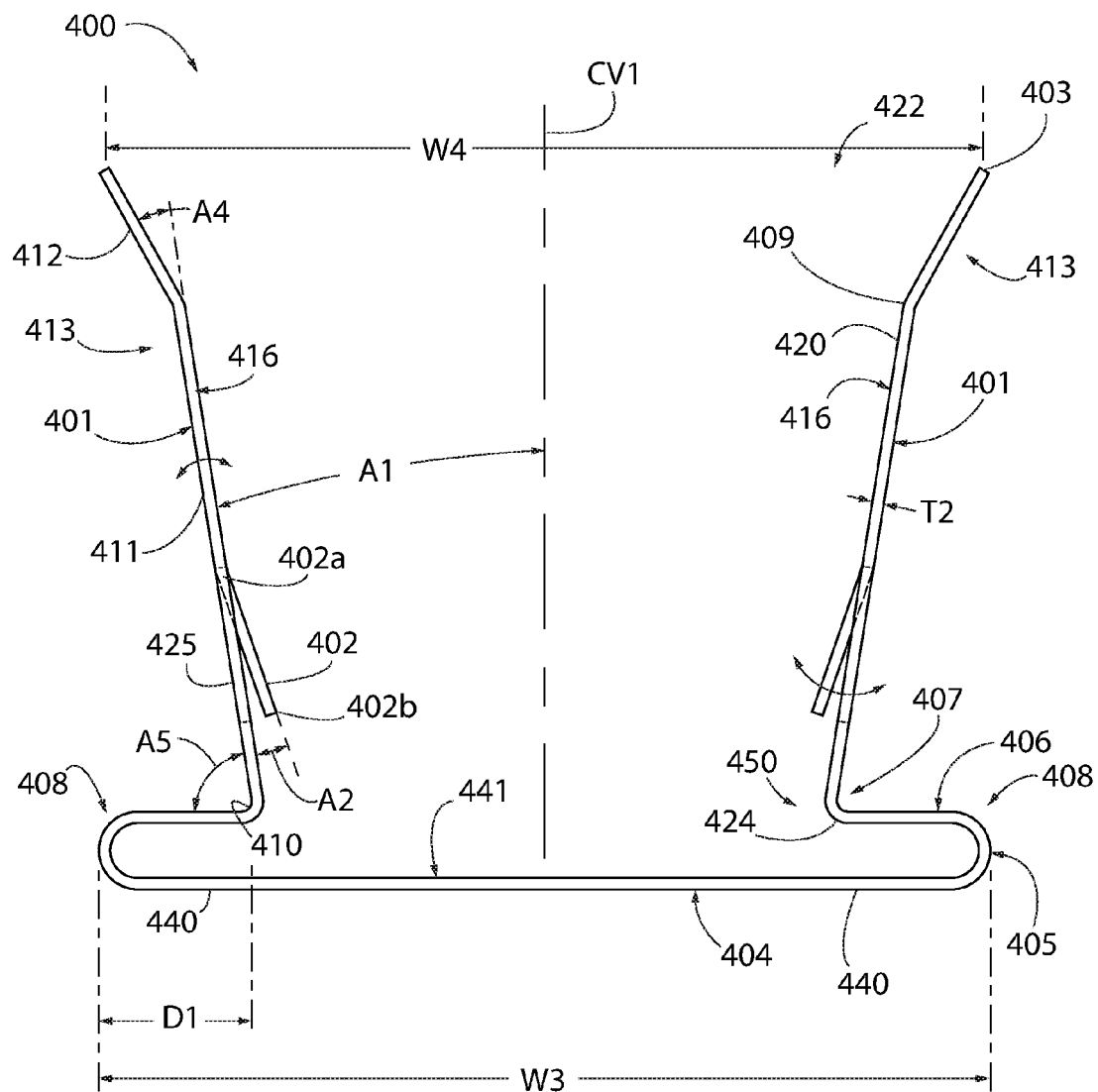
FIG. 2 is a side elevation view thereof.
Figure 3:
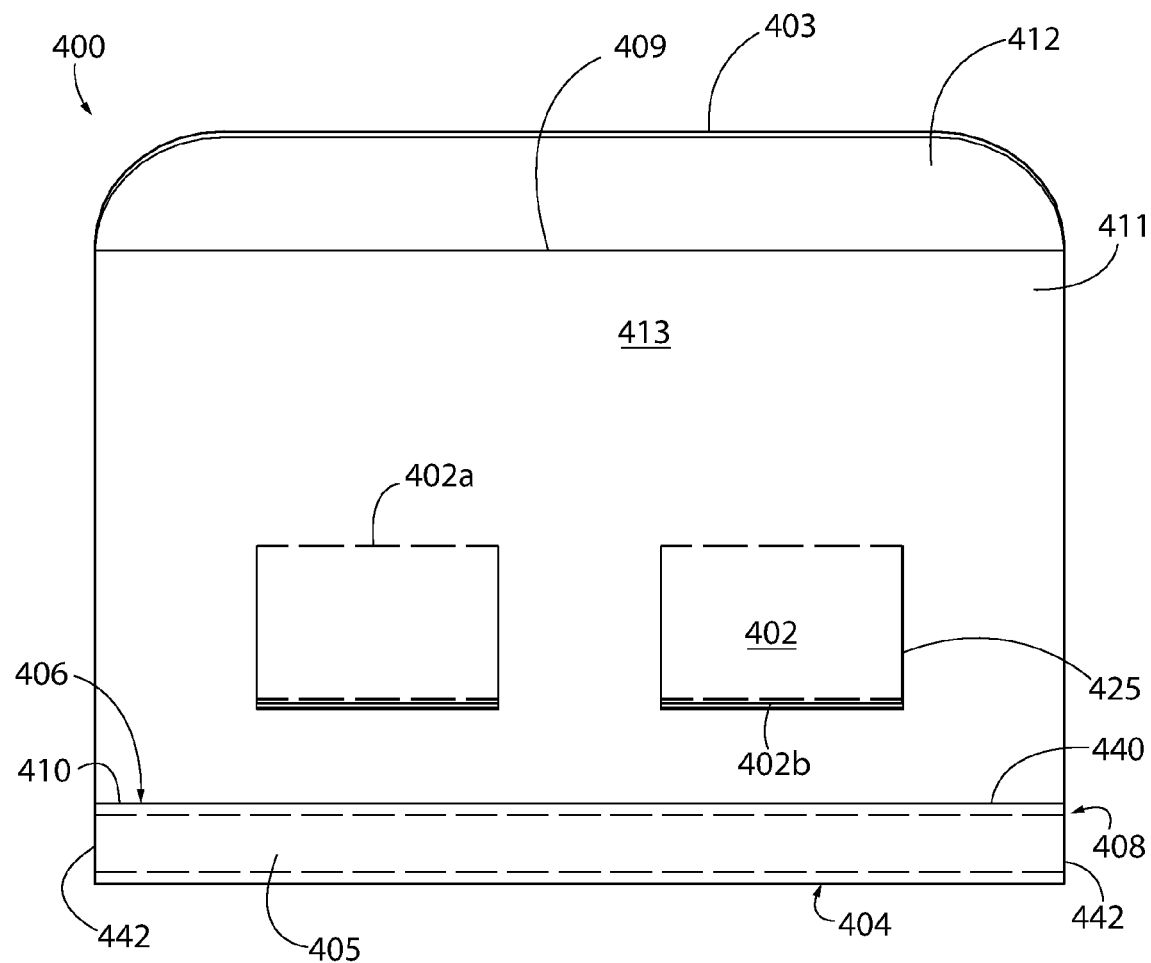
FIG. 3 is an end elevation view thereof.
Figure 4:
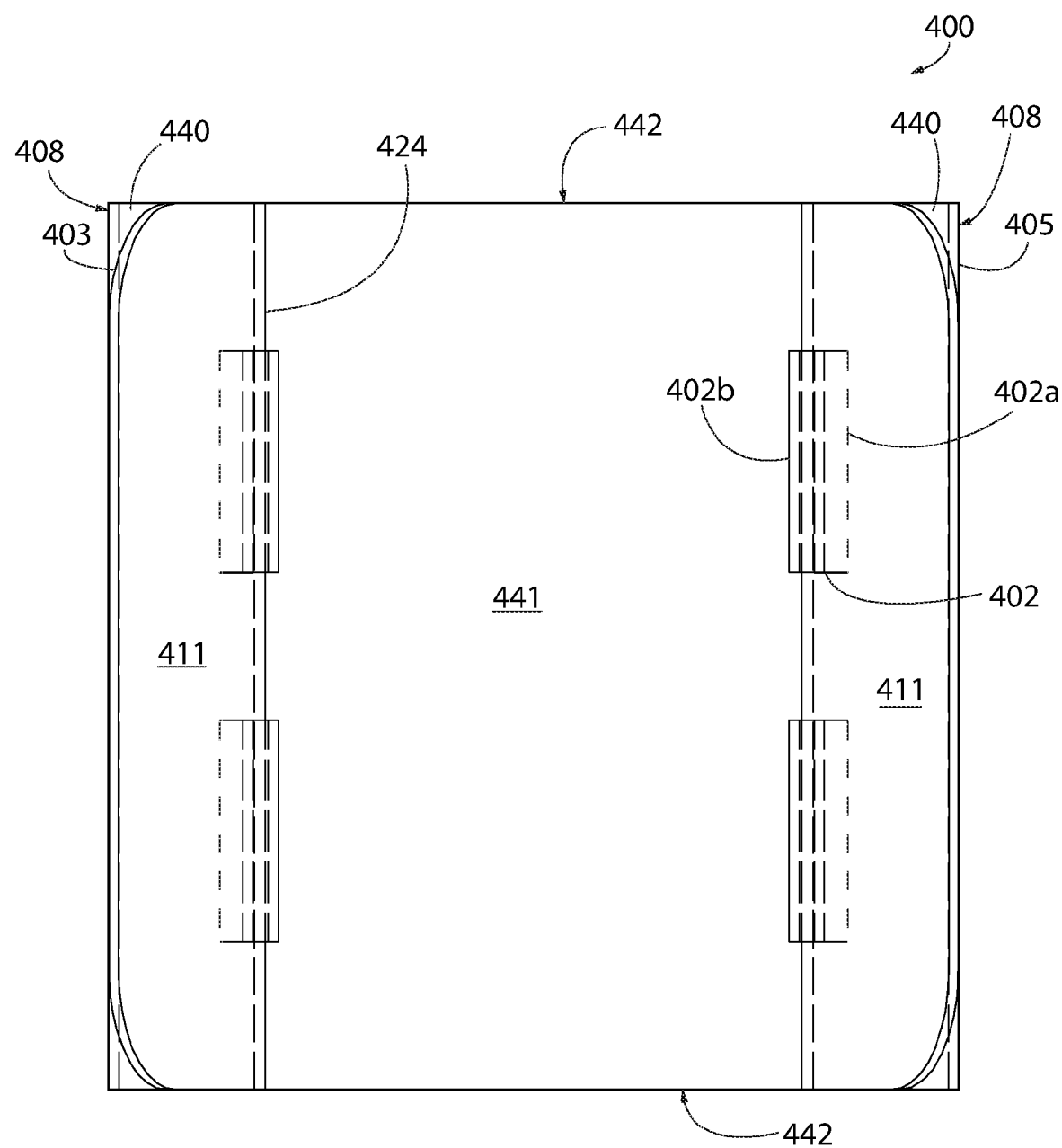
FIG. 4 is top plan view thereof.
Figure 7:
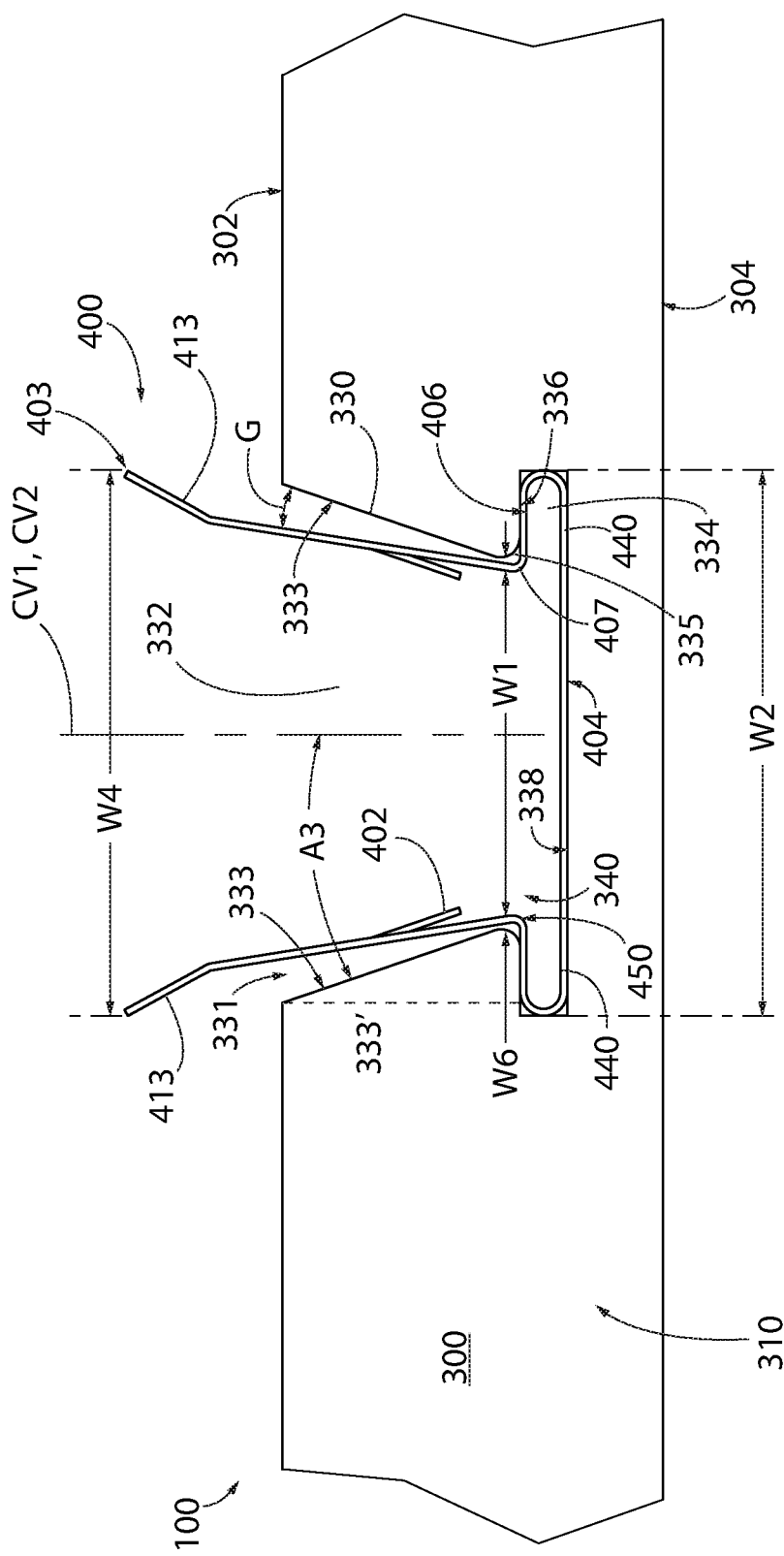
FIG. 7 is an enlarged detail VII taken from FIG. 6.
Figure 14:
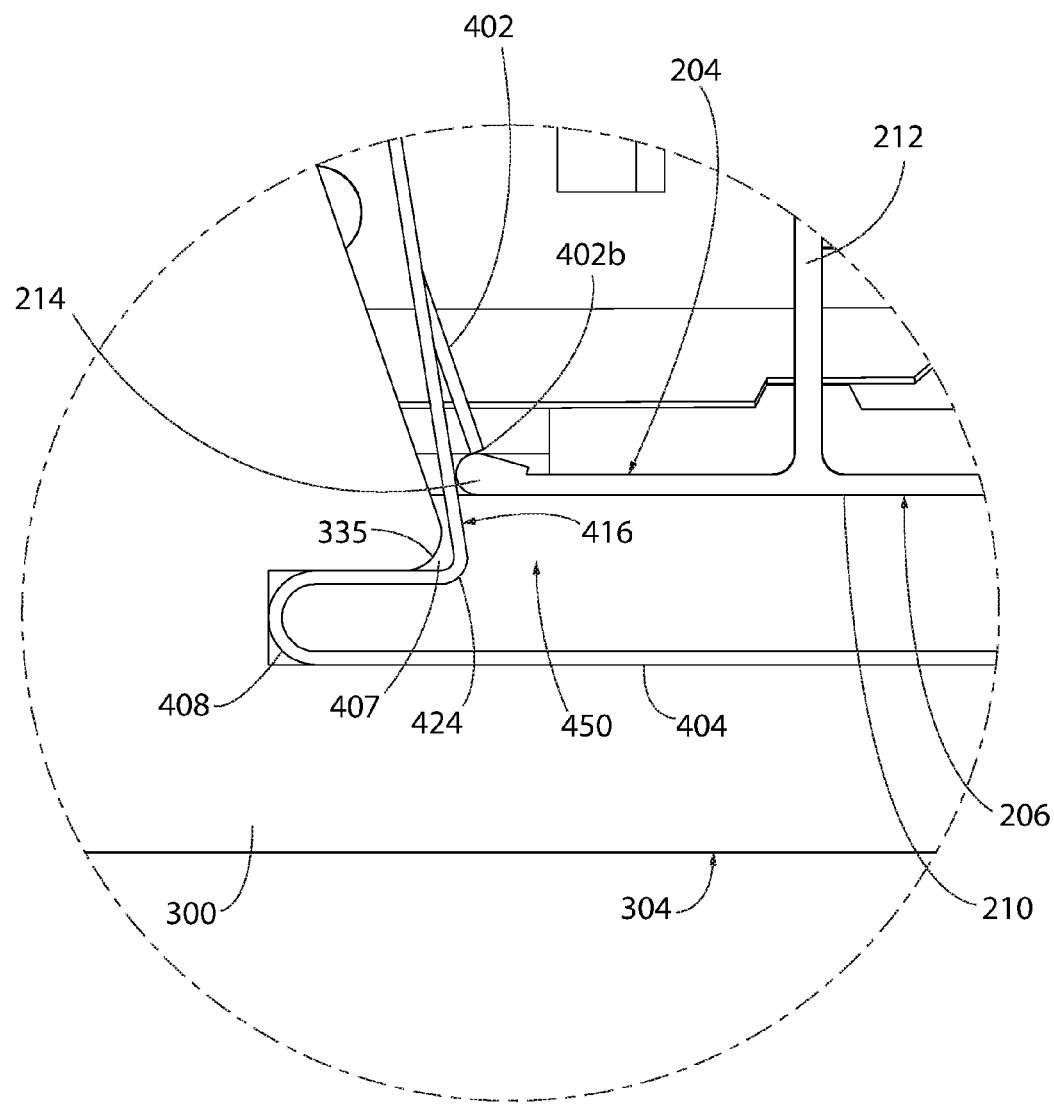
FIG. 14 is an enlarged detail XIV taken from FIG. 13.

In one embodiment, as shown in the figures, angled sidewalls 333 are desired which forms a pair of inwardly projecting protrusions 335 configured to be received at least partially in and engage a pair of outwardly open notches 407 of the retaining clip 400 (see, e.g. FIGS. 2, 7, and 14). The protrusions 335 create a pair of opposing shoulders in channel 330 that engage retaining clip 400. This ensures a snug fit for tightly securing the clips 400 in the channel 330 to minimize possible rotation of the retaining clip 400 with respect to the channel 330 when locking the ceiling tile 300 to the support grid 200. The engagement between the protrusions 335 and notches 407 further creates a pivot point around which the angled sidewalls 333 may rotate and expand laterally outwards when being locked to a grid support member 202.

As shown in FIG. 7, the lower mounting receptacle 334 is complementary configured in cross sectional shape to the laterally widened mounting base or flange 408 of retaining clip 400 (see also FIG. 2 of retaining clip). This securely holds the retaining clip 400 in the mounting channel 330 of the ceiling tile 300. The mounting receptacle 334 is located between the bottom surface 304 and top surface 302 of the ceiling tile. In one arrangement, mounting receptacle 334 may be spaced vertically apart from and does not penetrate bottom surface 304 of ceiling tile 300 so that the overhead support grid 200 will be completely concealed from view beneath the ceiling tile (see also FIG. 13).

Mounting receptacle 334 defines a downward facing bearing surface 336 which engages upward facing top surface 406 on retaining clip 400. Upward facing bearing surface 338 of mounting receptacle 334 engages downward facing bottom surface 404 of retaining clip 400. Mounting receptacle 334 communicates with upper receptacle 332 to allow the resiliently flexible mounting wings 413 of retaining clip 400 to extend upwards through the channel 330 for engaging the support grid 200. The mounting receptacle 334 has a width W2 which is sized just slightly larger than width W3 of mounting flange 408. This allows the mounting flange 408 to be slideably inserted and moved within channel 330 without excessive looseness that might allow the ceiling tile 100 to wobble when installed in the support grid 200.

A narrow throat portion 340 is formed between upper and lower receptacles 332, 334 by the horizontal gap created between the inward protrusions 335 on each sidewall 333 of the mounting channel 330, as shown in FIG. 7. The throat portion 340 has a width W6 which is smaller than the width W3 of the retaining clip bottom mounting flange 408 (see also FIG. 2). This prevents the retaining clip 400 from being withdrawn vertically from the ceiling tile channel 330 to ensure that the ceiling tile 300 remains secured to the overhead grid support members 202. Width W6 of the throat portion 340 is therefore smaller than width W2 of the lower receptacle 334.

Any suitable number and arrangement of channels 330 may be provided so long as the ceiling tile 300 may be securely fastened to the overhead support grid 200 with retaining clips 400. In various embodiments, at least two channels 330 arranged in intersecting or parallel relationship to each other may be used so that the retaining clips are not all arranged in the same vertical mounting plane to avoid rotation of the ceiling tile and provide secure installation. More mounting channels 330 may be desired for a secure mount depending on the size and shape of the ceiling tiles used. In one exemplary arrangement shown in FIG. 5, multiple intersecting channels 330 are provided. As shown each mounting channel 330 may include one or more retaining clips 400 with at least some of the clips disposed near the peripheral sides 306, 308, 310, and 312 of the ceiling tile proximate to where the ceiling tile will abut an adjacent tile for providing a relatively tight flush joint.

FIGS. 1-4 show a ceiling tile retaining clip 400 in greater detail. Retaining clip 400 has a generally truncated V-shaped body that defines a vertical centerline CV1 and longitudinal axis LA which generally coincides and aligns with the longitudinal axis of a grid support member 202 and axially elongated mounting channels 330 formed in the ceiling tiles 300 when the retaining clip is coupled to both the support member and ceiling tile. Retaining clip 400 further defines a pair of axial ends 442 oriented transversely to longitudinal axis LA. Retaining clip 400 has an axial length L1 which may be less than the length of a mounting channel 330 which may be measured along the width or length dimension D1 of the ceiling tile 300 (see also FIG. 5). This allows the retaining clip 400 to be mounted in a plurality of possible mounting positions on the ceiling tile. Accordingly, mounting channel 330 has a length that is at least as long as length L1 of retaining clip 400, and preferably longer than twice the length of L1 to provide multiple mounting locations or positions for the retaining clip.

Retaining clip 400 further includes two opposing resiliently flexible and laterally movable upright mounting elements such as mounting wings 413 extending upwards from a common mounting base such as flange 408. The mounting flange 408, being captured by the mounting channel 330 of the ceiling tile 300, is intended to remain relatively stationary in position during the process of mounting the ceiling tile to the support grid 200 whereas the mounting wings 413 are elastically deformable to lock the ceiling tile to the support grid, as further described herein.

The body of the retaining clip may be formed as a single unitary structure in which the mounting wings 413 and mounting flange 408 are all integral portions of the unitary body. In other possible embodiments, the mounting wings 413 may be separate elements coupled to mounting flange 408 in any suitable manner such as welding, solder, fasteners, interlocked structures, etc.

Referring generally now to FIGS. 1-4, 7, 13, and 14, the mounting wings 413 are spaced laterally apart to define a widened entrance or top opening 422 having a width W4 (measured between top edges 403) that is sized to receive the bottom flange 210 of a grid support member 202 when inserted vertically downwards into the retaining clip. Accordingly, width W4 is larger than the lateral width W5 of the bottom mounting flange 210 of the grid support member 202. Each mounting wing 413 includes an an upper section 412 defining an upper free terminal edge 403, a middle section 411, and a lower end 410 which conjoins bottom mounting flange 408. In some embodiments, upper section 412 of each mounting wing 413 may be flared outwards about a bend line 409 at an angle A4 to the middle section 411. Angle A4 may be between 0 and 90 degrees, and preferably between 0 and 45 degrees in various embodiments. Each mounting wing 413 further defines a pair of inner bearing surfaces 416 which face inwards towards each other and vertical centerline CV1 defined by the retaining clip 400. The bearing surfaces 416 are configured and arranged to slideably engage bottom flange 210 of a grid support member 202 during the ceiling tile mounting process, as further described herein.

Mounting wings 413 may be slanted and angled outwards away from vertical centerline CV1 and diverge by a progressively increasing horizontal distance from centerline CV1 in moving vertically upward away from the bottom mounting flange 408, as shown. In one embodiment, each mounting wing 413 may be disposed at an angle A1 from vertical centerline CV1 between 0 and 90 degrees, and more preferably between 0 and 45 degrees. The angled wings 413 define an interior cavity 420 therebetween configured and dimensioned to receive bottom flange 210 at least partially into the cavity (see, e.g. FIG. 13). In one embodiment, cavity 420 may have a frusto-conical shape in transverse cross section.

Bottom mounting flange 408 of retaining clip 400 defines an opposing pair of laterally outward extending engagement protrusions 440 configured to engage lateral end portions of lower mounting receptacle 334 in the ceiling tile 100. Mounting flange 408 includes an outer bottom surface 404, opposing outer top surface 406, opposing inner top surface 441, and a pair of opposing longitudinally-extending lateral ends 405 oriented parallel to longitudinal axis LA. The distance between the ends 405 defines a mounting flange width W3. Each mounting wing 413 is disposed at an angle A5 to the top surface 406 of the mounting flange 408. In some embodiments, angle A5 may be between 0 and 90 degrees which creates the angled or sloped inner bearing surfaces 416 inside the retaining clip opposite outer surfaces 401 of the mounting wings 413. The inner bearing surfaces 416 may be substantially parallel to outer surfaces 401 creating a substantially uniform thickness T2 for each mounting wing 413 (see also FIG. 2).

In one embodiment, bottom mounting flange 408 of retaining clip 400 may have an at least partially open interior space defined between the vertically spaced apart top and bottom surfaces 406, 404 of the flange. The mounting flange 408 may form a generally V-shaped shoulder or corner 424 (which may be slightly rounded) forming a laterally narrowed throat portion 450 of the retaining clip 400 and outwardly open notches 407 configured for engaging mounting channel 330, as described herein. The inwardly projecting corners 424 are resiliently flexible and vertically movable to a degree upon applying a generally downward force against the top edges 403 of the mounting wings 413. Accordingly, top surface 406 of mounting flange 408 is in turn resiliently deformable to a degree with respect to the bottom surface 404 due to the open interior space formed between the surfaces. This may assist with sliding and then maintaining the retaining clips 400 in a desired mounting position within the longitudinally extending channels 330 formed in the ceiling tiles 300. For example, a clip 400 may be inserted into a channel 330 through a peripheral side 306, 308, 310, or 312. The installer may then press downwards with a force against the mounting wings 413 which temporarily and resiliently deforms the corners 424, thereby displacing them slightly downwards to relieve some of the frictional pressure between the adjacent top surface 406 of the mounting flange 408 and the downward facing bearing surface 336 in the lower receptacle of the ceiling tile channel (reference FIG. 7). This allows the clip 400 to slide more easily within the channel 330. When a desired position of the clip 400 is reached, the installer releases the mounting wings 413 thereby removing the downward force. The top surface of retaining clip 400 springs back upwards and increases the frictional force against the bearing surface 336 to help frictionally retaining the clip in position with channel 330 until the ceiling tile 300 is mounted to the overhead support grid 200.

It will be appreciated that in other possible embodiments, the bottom mounting flange 408 of retaining clip 400 may be solid without an interior space and vertical deformability between the top and bottom surfaces 406, 404.

Referring to FIGS. 1-4, retaining clip 400 further includes at least one opposing pair of resiliently movable locking tabs 402 which are each configured to engage grid support member 202 for locking the ceiling tile 100 to the support grid 200. Locking tabs 402 may each be hingedly connected to a mounting wing 413 at a top hinged end 402a and have a bottom free end 402b which engages upward facing bearing surface 204 on the bottom flange 210 of the grid support member 202, as further shown in FIG. 13. In one embodiment, the free ends 402b of tabs 402 are arranged to engage the opposing longitudinally extending lateral edges 214 of the bottom flange 210.

As best shown in FIG. 2, locking tabs 402 project inwards from each mounting wing 413 of retaining clip 400 and are disposed at an angle A2 to the wings. In one non-limiting embodiment, angle A2 may be between 0 and 45 degrees. The tabs 402 are movable laterally outward by engagement with the bottom flange 210 of the grid support member 202 when inserted into the retaining clip 400. The grid support member 202 creates a laterally outward force against the locking tabs 402 to temporarily deflect and spread the tabs apart. The locking tabs 402 elastically return inwards towards an undeflected position upon disengagement from the bottom flange 210 of the grid support member 202. The tabs 402 may be rigidly structured with respect to the mounting wings 413 (e.g. by making the vertical length of the tabs relatively short) so that the grid support member 202 deflects both the tabs and mounting wing upon contact. In other embodiments, the tabs 402 may be movable with respect to the mounting wings 413 to a degree such that the grid support member 202 deflects either the tabs alone upon contact or both the tabs and mounting wings. Any of the foregoing constructions are satisfactory so long as the locking tabs 402 are deflected and spread apart by the grid support member 202.

Figure 13:
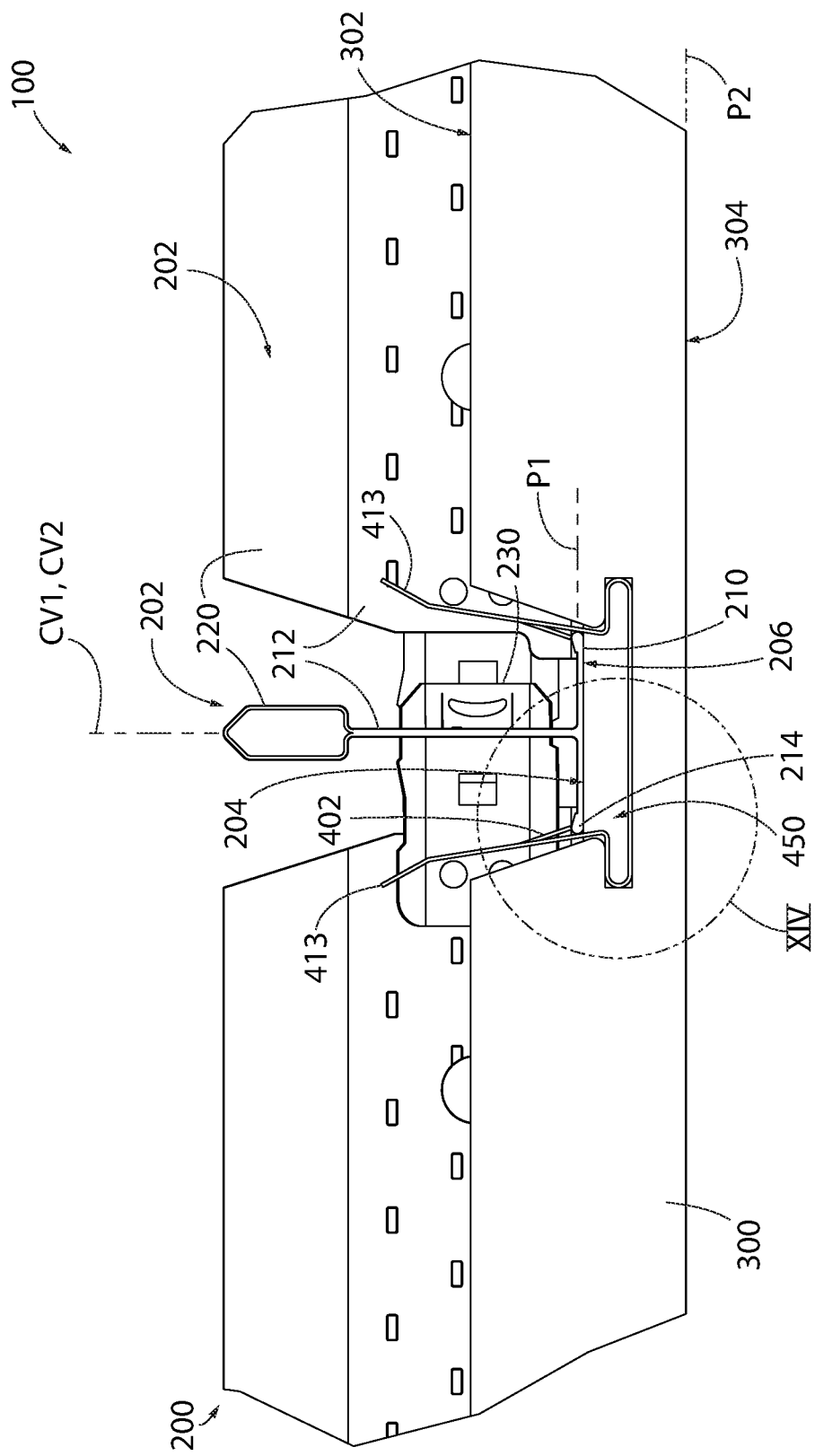
FIG. 13 is an enlarged detail XIII taken from FIG. 12.

The locking tabs 402 are disposed between the top edges 403 and bottom mounting flange 408 of the retaining clip 400 at a position that is located between the top and bottom surfaces 302, 304 of the ceiling tile when the retaining clip is mounted therein (see, e.g. FIG. 13). This provided a stable ceiling tile mount and minimizes the total combined height of the ceiling tile and grid support member combination for compact installations. In one embodiment, the locking tabs may be located more proximate to the bottom mounting flange 408 of retaining clip 400 than the top edges 403 at a position adjacent to throat portion 450 where the width of the retaining clip cavity 420 is less than the width W5 of the grid support member bottom flange 210 to trap the flange beneath the locking tabs (see also FIGS. 2, 7, and 13-15).

The locking tabs 402 may be formed as an integral unitary structural part of the mounting wings 413 by creating a three-sided rectilinear cut in the wing and bending the tabs inwards away from the wings towards vertical centerline CV1. This embodiment formed a cutout window 425 in the mounting wings 413 below the hinged end 402a of each locking tab 402. Each locking tab 402 is laterally moveable into and out of its respective window 425.

In other possible embodiments contemplated, locking tabs 402 may be formed as separate elements which are attached to mounting wings 413 by any suitable means to form a hinge such as with fasteners, soldering, welding, adhesives, or other. In one preferred embodiment, the locking tabs 402 are integrally formed from a part of mounting wings 413 in the manner described above for simplicity of manufacture and cost-effectiveness. Any suitable number of locking tabs 402 may be provided. Each mounting wing 413 preferably includes at least one locking tab 402.

Figure 10:
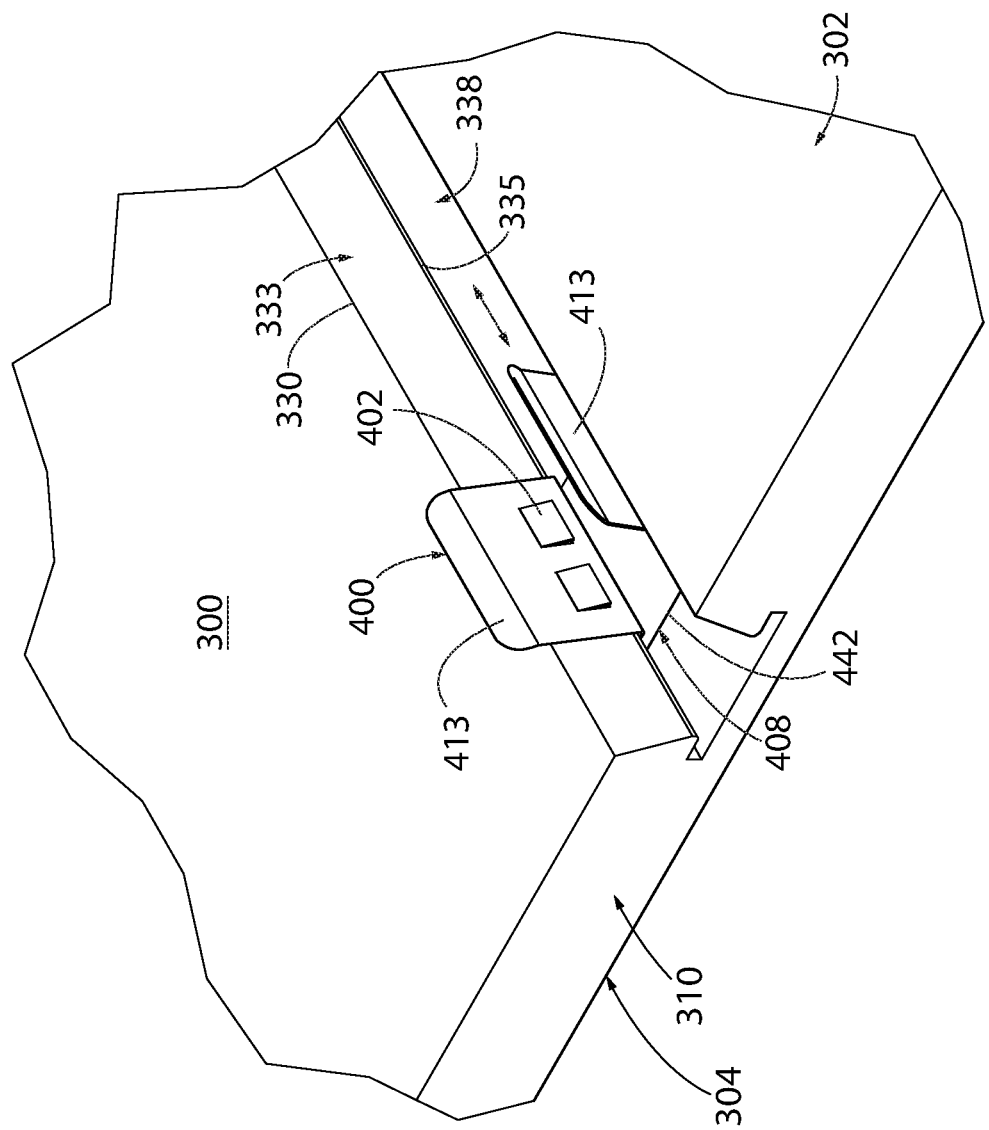
FIG. 10 is an enlarged detail X taken from FIG. 9.
Figure 11:
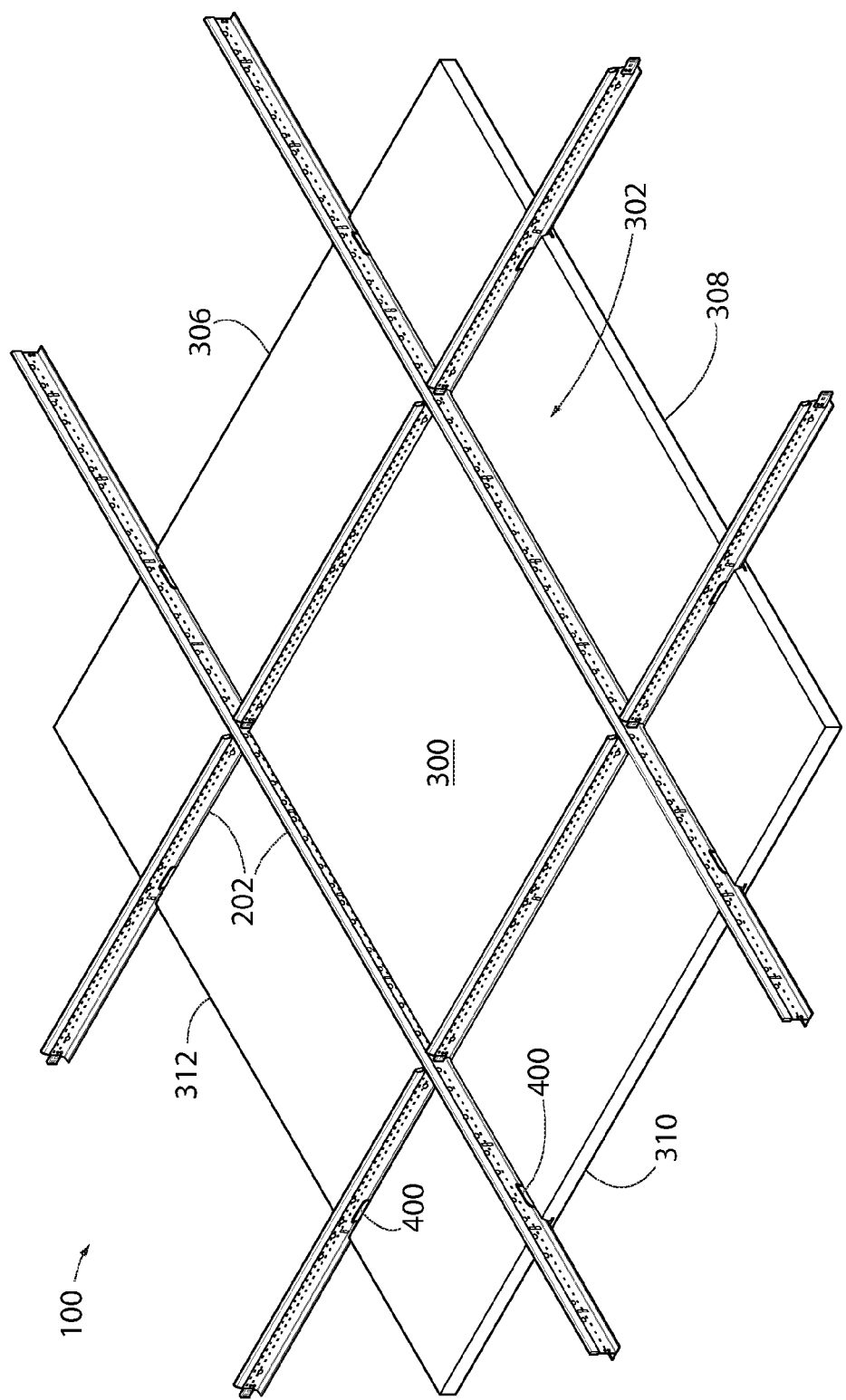
FIG. 11 is a top perspective view the fully assembled ceiling system with the ceiling tile mounted to the grid support members using the retaining clips.
Figure 12:
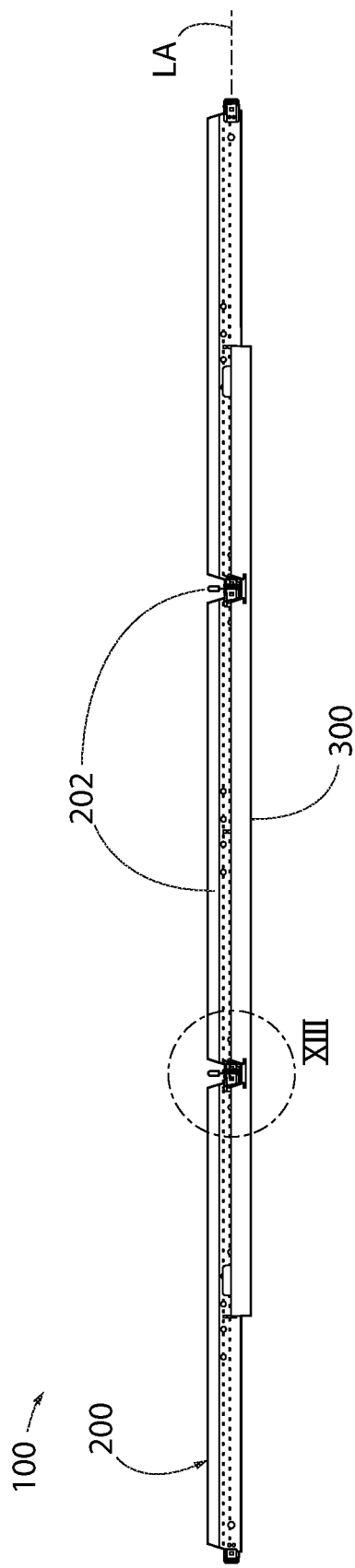
FIG. 12 is a side elevation view thereof.

When retaining clip 400 is mounted in a mounting channel 330 of the ceiling tile 300, the upper portion and top edges 403 of mounting wings 413 extend vertically above the top surface 302 of the ceiling tile as shown for example in FIGS. 7, 10, and 13. This positions the mounting wings 413 to cleanly receive and engage a grid support member 202 being inserted through the top opening 422 of the retaining clip.

Retaining clips 400 may be made of any suitable resiliently deformable metallic or non-metallic material having an elastic memory which allows mounting wings 413 and locking tabs 402 to be laterally deflected by grid support members 202 and then return towards the original undeflected position. In one preferred embodiment, retaining clips 400 may be made from spring steel or other resiliently deformable metal. In other possible embodiments, a suitably strong and resilient plastic material may be used. The retaining clips 400 may be fabricated by any suitable method (s) used in the art such as without limitation stamping, bending, extrusion, cutting, and others depending on the shape and material of construction intended for the clips.

A method or process for mounting a ceiling tile to an overhead support grid of a ceiling system will now be described. In one embodiment, the ceiling system is a concealed grid ceiling system 100. As further describe below, the grid support member 202 is vertically movable from an entrance position to a locked position in the retaining clip wherein the grid support member is locking engaged with the retaining clip.

Figure 8:
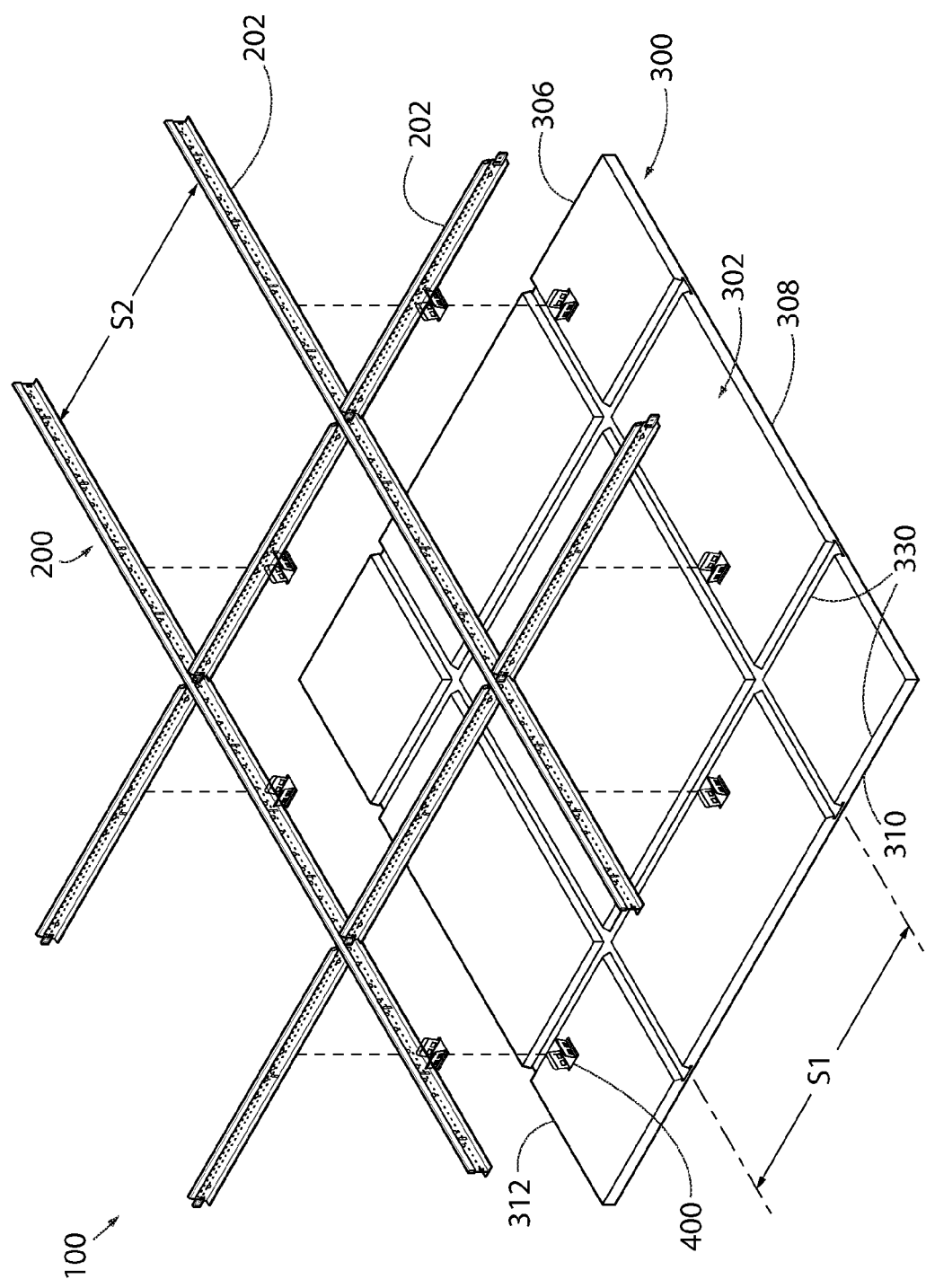
FIG. 8 is an exploded top perspective view of an unassembled ceiling system including grid support members forming a support grid, retaining clips, and a ceiling tile.

The method begins with first providing the ceiling system components, as shown for example in FIG. 8. This includes a support grid comprised of a plurality of grid support members 202 which have been preassembled and already mounted from or to an overhead support structure in the configuration shown in one exemplary embodiment, a ceiling tile 300, and a plurality of retaining clips 400.

Referring generally to FIGS. 5-13, the method continues by next installing the retaining clips 400 in the mounting channels 330 in the ceiling tile 300. The clips 400 are each laterally and slideably inserted through open ends of the mounting channels 330 formed through peripheral sides 306, 308, 310, and/or 312 of the ceiling tile 300. After initial insertion of a clip 400 into a channel 330, the installer may optionally press downwards against the mounting wings 413 to relieve the frictional engagement between the upward facing top surfaces 406 of the clip mounting flange 208 and downward facing surfaces in the lower mounting receptacle 334 of the channels 330, in the manner already described herein. The retaining clips 400 may be slid along the length of the channels between a continuum of possible axial mounting positions in the channels between the peripheral sides of the ceiling tile 300. When the desired mounting position is reached, the retaining clip 400 may be released by the installer. The clips 400 are maintained in position by frictional engagement with the mounting channels 330. The clips 400 are positioned and ready for mounting to the support grid 200. The upright mounting wings 413 of the retaining clips 400 are in an initial undeflected position.

Figure 9:
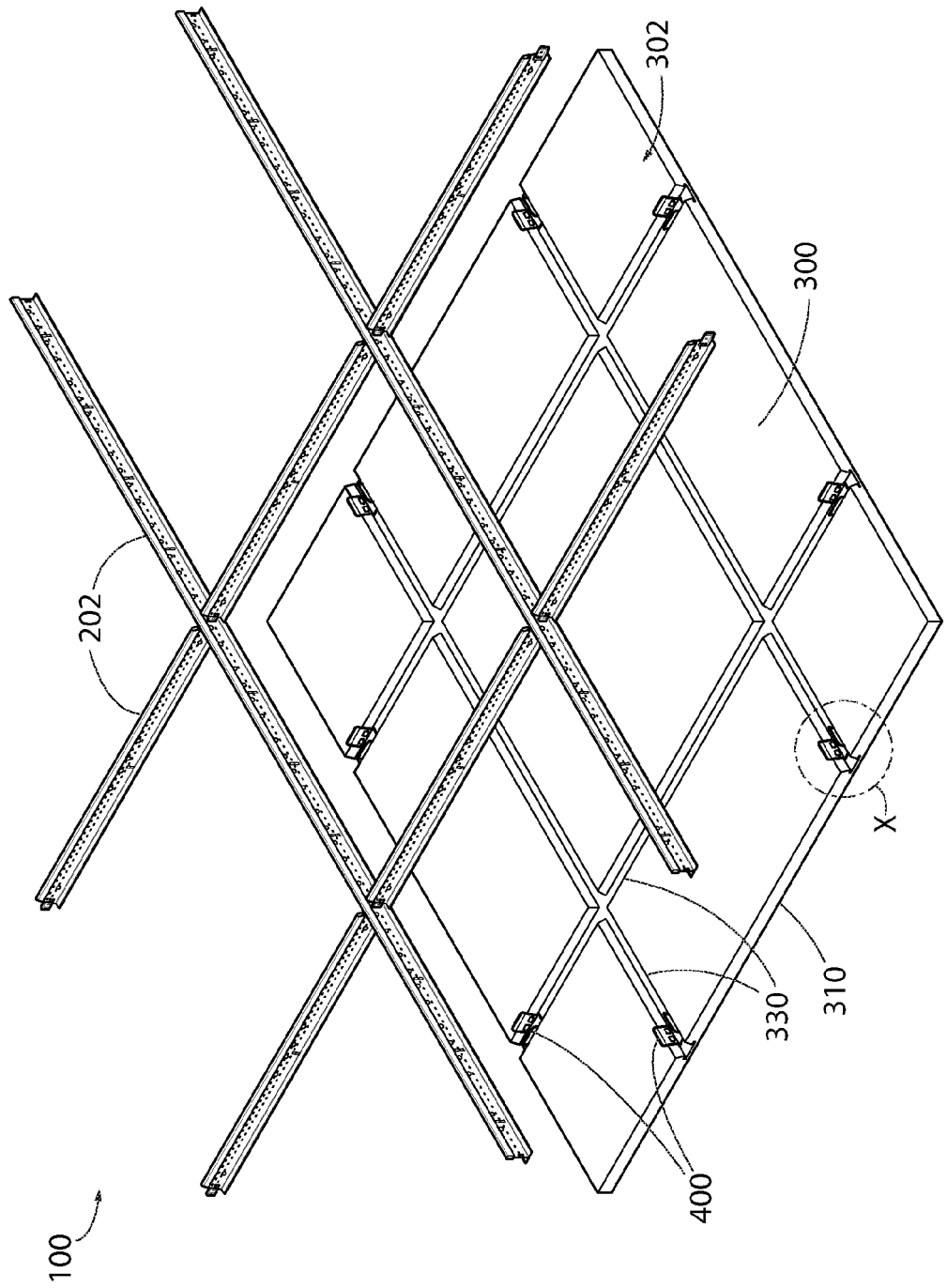
FIG. 9 is an exploded top perspective view thereof with the retaining clips installed in mounting channels formed through the top of the ceiling tile.

In one embodiment, the retaining clips 400 are preferably located so that a clip is positioned proximate to the peripheral sides of the ceiling tile in each of the mounting channels 330 (see, e.g. FIGS. 5, 9, and 10). In some embodiments, the retaining clips 400 may be spaced inwards in the channels 330 away from the peripheral sides, as shown. This retaining clip 400 position ensures that the peripheral side regions of the ceiling tile are securely mounted to the overhead support grid 200 to form relatively tight joints with and substantially flush bottom surfaces between adjacent tiles for aesthetic reasons. Additional intermediate retaining clips 400 may be provided between the peripherally-located clips for added support, as needed depending on the size and weight of the ceiling tile 300.

With the retaining clips 400 now installed in the foregoing mounted positions in mounting channels 330, the ceiling tile 300 is raised vertically upwards towards the support grid 200 so that the ceiling tile is proximate to the grid (see, e.g. FIG. 9). The horizontal position and orientation of the ceiling tile 300 may be adjusted so that the retaining clips 400 are each vertically aligned with a corresponding grid support member 202. Since the installer is located below the ceiling tile 300 during installation, the support members 202 above the tile cannot generally be viewed directly. However, because the grid support members 202 each form axially aligned runners and cross-pieces with remaining exposed support members, the installer can approximate the proper horizontal position of the ceiling tile as needed.

The installer next raises the ceiling tile 100 vertically upwards against the overhead support grid 200, preferably creating light contact initially. The horizontal position and orientation of the ceiling tile 300 may be adjusted so that the bottom flanges 210 of the grid support members 202 are horizontally and vertically centered over the top openings 422 of the retaining clips 400 so that the vertical centerlines CV1 and CV2 of the retaining clips and ceiling tile mounting channels 330 are substantially aligned. The widened top opening 422 of the retaining clips 400 facilitates this positioning. Because the top edges 403 of the retaining clips 400 are raised above the top surface 302 of the ceiling tile, the installer can generally determine by feel that the bottom flanges 210 of the grid support members 202 are properly aligned with the top openings 422 of the retaining clips 400.

At this point in the installation process, the retaining clips 400 are not lockingly engaged with the grid support members 202.

With the retaining clips 400 now properly aligned with the grid support members 202, the ceiling tile 300 is further raised vertically upwards towards the support grid 200. The bottom flange 210 of each grid support member 202 travels downwards in cavity 420 from the top opening 422 of the retaining clip 400 towards the bottom mounting flange 408 of the retaining clip. As the cavity 420 of the retaining clip 400 gradually narrows towards the bottom (see, e.g. FIG. 7 entrance width W4 to throat portion 450 width W1), the longitudinally extending lateral edges 214 of the bottom flange 210 moves downwards and may slidingly engage one or both inner bearing surfaces 416 of the retaining clip 400 depending on the width W5 of the grid support member mounting flange 210 and of the cavity at different portions. Accordingly, in some embodiments, the opposed lateral edges 214 of the bottom flange 210 may mutually engage portions of the inner bearing surfaces 416 on each mounting wing 413 above the locking tabs 402, which would deflect the elastic mounting wings 413 laterally outwards in opposing directions and narrows the width of gap G formed on each side of the retaining clip (reference FIGS. 7 and 13). In other embodiments, the opposed lateral edges 214 of the bottom flange 210 may not engage portions of the inner bearing surfaces 416 on each mounting wing 413 above the locking tabs 402, in which case no deflection of the mounting wings would occur.

Eventually, lateral edges 214 of the bottom flange 210 on the grid support member 202 approach and slidingly engage the locking tabs 402 of the retaining clip 400. This gradually deflects the tabs 402 laterally outwards farther and farther as the support member 202 progresses downward in the retaining clip. In some embodiments, the locking tabs 413 may be somewhat rigidly structured in relation to the mounting wings 413 so that the grid support member 202 deflects and spreads the mounting wings outward with the locking tabs. In other possible embodiments, the locking tabs 402 alone may be deflected towards the mounting wings 413 or both the locking tabs and mounting wings may be spread apart by the mounting flange 210 of the grid support member 202.

In any of the foregoing deflection scenarios, the locking tabs 402 are spread apart by sufficient horizontal distance to allow the opposed lateral edges 214 of the bottom flange 210 on the grid support member 202 to pass by the locking tabs. Once the lateral edges 214 reach a position below free end 402b of the retaining clip 400 (see also FIGS. 1-4), the locking tabs 402 snap back inwards engaging the top surface 204 of the bottom flange 210 near the lateral edges 214 of grid support member 202, as shown in FIGS. 13 and 14. The mounting wings 413 and/or locking tabs 402 alone may each return inwards to a substantially undeflected position. The ceiling tile 300 is now snap-fit and lockingly engaged with the overhead support grid 200 in a fully mounted position. The locking tabs 402 of the retaining clip 400 are substantially aligned in the same horizontal plane P1 as the bottom mounting flanges 210 of the grid support members 202 when the ceiling tile 300 is fully mounted to the support grid 200. As best shown in FIG. 14, the lateral edges 214 of the grid support member 202 are trapped between the free ends 402b of locking tabs 402 and inner bearing surface 416 in the narrowed throat portion 450 of the retaining clip 400 because the throat portion has a smaller width W1 than width W5 of the grid support member mounting flange 210. The grid support member 202 cannot be vertically withdrawn from the retaining clip 400 without first forcing the locking tabs 402 back outwards to disengage the tabs from the bottom mounting flange 210, and then raising the grid support member 202 upwards by simultaneously lowering the ceiling tile 300. When the ceiling tile is mounted to the support grid 200, the locking tabs 402 of the retaining clip 400 are generally accessible from only above the ceiling tile 300.

It should be noted that the foregoing ceiling tile snap-fit mounting mechanism creates an audible "click" to confirm to the installer that the ceiling tile 300 has been fully and properly mounted. Advantageously, this assists signals installers who cannot directly see the engagement between the retaining clips 400 and the grid support members 202.

The foregoing ceiling tile installation process may be repeated as necessary to add additional ceiling tiles 300 to the support grid 200.

It will be appreciated that the ceiling tile 300 mounting system described herein advantageously does not limit the shape of ceiling tiles that may be used. The mounting is controlled by the pattern/arrangement and lateral spacing of the overhead grid support members 202 and their mating mounting channels 330 formed in the top surface 302 of the ceiling tile 100 which hold the retaining clips 400. The arrangement of the grid support members 202 and mounting channels 330 is therefore independent of the shape of the ceiling tile used. Accordingly, ceiling tiles 300 may be used having different shapes than the openings 208 formed by the grid support members 202 and the layout of the mounting channels 330.

Although a square rectilinear ceiling tile is shown herein for describing one possible non-limiting embodiment, the invention is not limited to such rectilinear shapes (e.g. square, rectangular) alone. Other polygonal shapes (e.g. diamond, triangular, hexagon, etc.) and combinations of shapes may be used for ceiling tiles and mounted to an overhead support grid in accordance with the ceiling tile mounting system disclosed herein.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A ceiling system comprising:
   a first grid support member comprising a bottom portion, the first grid support member defining a longitudinal axis;

a ceiling apparatus comprising:
  a ceiling tile comprising:
    a first mounting channel formed in a top surface of the ceiling tile, the first mounting channel comprising an upper portion having a first transverse width and a lower portion having a second transverse width that is greater than the first transverse width, the upper portion of the first mounting channel forming a passageway from the top surface of the ceiling tile into the lower portion of the first mounting channel; and
  a first retaining clip coupled to the ceiling tile, the first retaining clip comprising:
    a mounting base positioned in the lower portion of the first mounting channel;
    an opposing pair of transversely spaced mounting wings extending upwards from the mounting base and through the upper portion of the first mounting channel so as to protrude above the top surface of the ceiling tile; and
  wherein the ceiling apparatus is coupled to the first grid support member such that the first grid support member at least partially nests within the first mounting channel, and the bottom portion of the first grid support member is engaged by the mounting wings of the first retaining clip, and the bottom portion being located below the top surface of the ceiling tile.

2. The system of claim 1, wherein the first retaining clip and the first mounting channel have a complementary configuration in transverse cross section that is shaped such that the first retaining clip cannot be fully inserted into the first mounting channel in a direction perpendicular to the longitudinal axis.

3. The system of claim 1, wherein the first retaining clip includes a narrowed throat portion disposed between top edges of the mounting wings and the mounting base, the throat portion having a transverse width that is less than a transverse width of the mounting base.

4. The system of claim 1, wherein the first retaining clip further comprises opposing recurvate ends, the mounting base comprises a planar bottom section that extends between the recurvate ends; and wherein each of the recurvate ends define an engagement protrusion that extends transversely outward beyond a narrowed section of the upper portion of the first mounting channel.

5. The system of claim 1, wherein the mounting wings each include a locking tab protruding inwards toward a centerline of the first retaining clip, the locking tabs engaging the first grid support member in a locked positioned.

6. The system of claim 5, wherein each locking tab is disposed between a top edge of a respective mounting wing and the mounting base of the first retaining clip.

7. The system of claim 1, wherein the upper portion of the first mounting channel has opposing obliquely angled sidewalls forming a wedge-shaped gap between each mounting wing and a respective adjacent sidewall of the upper portion of the first mounting channel when the grid support member is fully inserted into the cavity of the first retaining clip.

8. The ceiling system according to claim 5, wherein the locking tabs engage the bottom portion of the grid support member.

9. The ceiling system according to claim 8, wherein the bottom portion comprises a flange that is located below the top surface of the ceiling tile, the grid support member further comprising a vertical web extending upwards from the flange, and when the grid support member is in a locked position in the retaining clip, the locking tabs engage the flange to secure the ceiling apparatus to the grid support member.

10. The ceiling system according to claim 1, further comprising a second grid support member, a second retaining clip, and the ceiling tile comprises a second mounting channel formed in the top surface of the ceiling tile, wherein the second mounting channel is parallel to the first mounting channel.

11. The ceiling system according to claim 10, wherein the second grid support member at least partially nests within the second mounting channel, and the second grid support member is engaged by the second retaining clip.

12. A retaining clip attachable to a grid support member of a ceiling system for supporting a ceiling tile, the retaining clip comprising:
  a longitudinal axis and a vertical centerline;
  a planar mounting base configured for embedded attachment in the ceiling tile;
  opposing recurvate ends located at opposite ends of the mounting base, the recurvate ends each defining an engagement protrusion extending outwards transversely to the longitudinal axis, a bottom section of the mounting base extending horizontally between the recurvate ends;
  a pair of longitudinally extending opposing upright mounting wings configured for locking engagement with the grid support member, the mounting wings each extending upwards from the recurvate ends of the mounting base, the mounting wings being spaced apart to define an upwardly open cavity configured to receive the grid support member at least partially therein;
  the mounting wings being resiliently deformable and transversely movable between undeflected and deflected positions; and
  a locking feature disposed on each mounting wing and extending from an inner surface of the mounting wing into the cavity and arranged to engage a top surface of the grid support member when in a mounted position, wherein the inner surface of each mounting wing diverges from the vertical centerline moving vertically upwards away from the mounting base.

13. The retaining clip of claim 12, wherein:
  the retaining clip includes a narrowed throat portion disposed between top edges of the mounting wings and the recurvate ends of the mounting base;
  each locking feature is disposed between the top edge of a respective mounting wing and the narrowed throat portion of the retaining clip;
  each locking feature is disposed between opposing axial ends of a respective mounting wing; and
  each recurvate end defines an outer top surface arranged parallel to the bottom section of the mounting base in vertically spaced apart relationship.

14. The retaining clip of claim 13, wherein the retaining clip includes a top opening configured and dimensioned to receive a portion of the grid support member therethrough, and the narrowed throat portion has a width less than a width of the grid support member.

15. The retaining clip of claim 12, wherein the inner surface is planar.

16. The retaining clip of claim 12, wherein the locking feature extends directly from the inner surface.

17. A ceiling system comprising:
  a first grid support member intersecting a second grid support member, the first and second grid support members being mountable from an overhead structure;

a ceiling tile comprising a top surface opposite a bottom surface and a plurality of peripheral edges extending therebetween defining a perimeter of the ceiling tile, wherein a first mounting channel and a second mounting are formed in the top surface of the ceiling tile; and a first retaining clip is slideably disposed in the first mounting channel and the second retaining clip is slideably disposed in the second mounting channel of the ceiling tile, the first and second retaining clips each including a mounting base positioned within each of the respective first and second mounting channels and an opposing pair of resiliently deformable mounting elements extending upwards from each mounting base; and wherein the first retaining clip is connected to the first grid support member and the second retaining clip is connected to the second grid support member.

18. The ceiling system according to claim 17, wherein at least a portion of the first and second grid support members nest within the mounting channel of the ceiling tile.

19. The ceiling system according to claim 17, wherein the portion of each of the first and second grid support members comprises a flange.

20. The ceiling system according to claim 17 wherein the first and second mounting channels intersect the perimeter of the ceiling tile.

* * * * *